INVENTORS
FRANK M. BERGER
JAMES G. MILLER
MARTIN J. FLETCHER

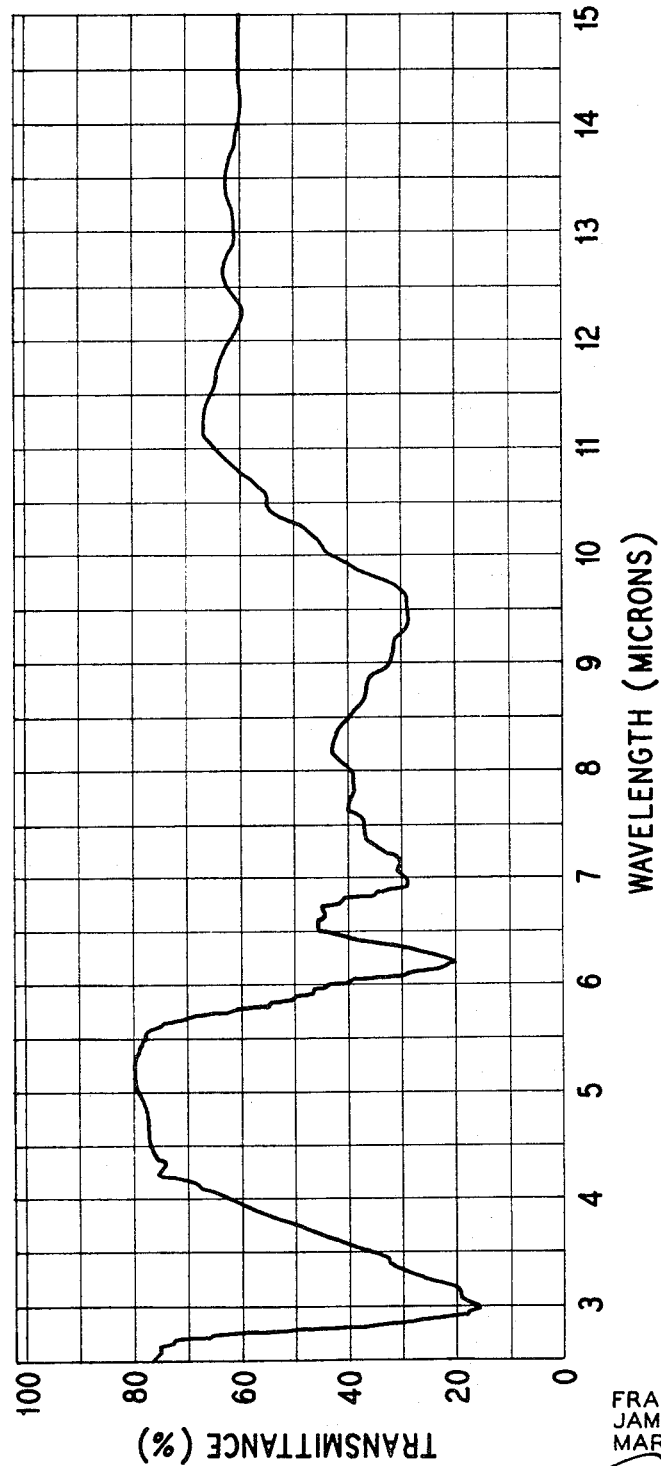

3,395,223
FERN EXTRACT FOR TREATING GASTRIC ULCERS
Frank McCan Berger, Princeton, N.J., James G. Miller, Ann Arbor, Mich., and Martin Joseph Fletcher, Belle Mead, N.J., assignors to Carter-Wallace, Inc., a corporation of Maryland
Filed May 13, 1965, Ser. No. 455,494
10 Claims. (Cl. 424—195)

ABSTRACT OF THE DISCLOSURE

An active component extracted from ferns of the polypodiaceae and Davalliaceae families, useful in the prevention and treatment of gastrointestinal ulcerations in warm-blooded animals, said component being obtained by treating the ferns with a delipification solvent to remove lipids therefrom, treating the residue with a polar solvent to extract the active component therefrom, and recovering the active component from the polar extract.

---

The present invention relates to a method of extracting valuable therapeutically active water-soluble compositions from certain ferns. In addition, the invention relates to said water-soluble active compositions and to the method of preventing and treating ulcers of the gastrointestinal canal in warm-blooded animals by the administration thereof.

A fern can be broadly defined as any of the pteridophytes constituting the order Filicales, distinguished from other pteridophytes in having few leaves, large in proportion to the stems, and bearing sporangia on the undersurface or margin.

The classification of ferns into related families, subfamilies, etc. has been, and still is, unsettled and many different schools of thought exist among pteridologists as to the correct way of classifying ferns. Consequently, for the sake of accuracy, the classification of E. B. Copeland (*Genera Filicum*, The Genera of Ferns, Chronica Botanica, Co., Waltham, Mass., 1947) will be adopted throughout the present specification and accompanying claims in describing the present invention. Such classification, according to some leading pteridologists, is thought to be the most authoritative published to date.

Copeland's classification divides ferns into 19 different families. It has been found that ferns which belong to two of said families, i.e. polypodiaceae and davalliaceae, yield the active compositions of the present invention when treated according to the extraction method hereinafter set forth. More particularly, it has been found that ferns which are classified by Copeland as belonging to the polypodiaceae family, Polypodium genus, *polypodioides* species and to the Davalliaceae family, Nephrolepsis genus, *exaltatum* species contain substantial amounts of the active compositions of the invention and are therefore preferred in the practice of the present invention.

In its broad aspect, the invention relates to a method for extracting novel therapeutic compositions from the hereinbefore-identified fern, said method comprising the steps of:

(1) Treating the ferns with a suitable solvent to extract therefrom lipid plant materials, leaving a residue containing water-soluble components;

(2) Treating the residue of step 1 with a polar solvent medium to obtain an extract containing the water-soluble active component; and (3) Recovering therefrom the active component in the solid form.

Preferably, in the practice of the invention, the aqueous extract of step 1 is subjected to further treatment so that the active component may be obtained in a more highly refined form upon concentration.

The above-described method is set forth below in more specific details.

In carrying out the delipification of step 1 the previously dried and ground plant material is extracted, preferably on a continuous basis, with a suitable delipification solvent. Operable solvents include, for example, saturated aliphatic hydrocarbons, such as hexane, heptane, petroleum ether, and the like; aromatic hydrocarbons, such as benzene, toluene, xylene, and the like; chlorinated hydrocarbons, such as ethylene dichloride, trichloroethylene, and the like; and ethers, such as diethyl ether, and the like. Preferred delipification solvents include an azeotropically-boiling mixture of about 2 parts of benzene and 1 part of ethyl alcohol, on a volume basis.

The delipified plant material is then treated with a polar medium to extract therefrom the water-soluble active component, in accordance with the hereinbefore described step 2. Preferred polar media are water and lower monohydric alcohols such as, for example, methyl alcohol, ethyl alcohol, and the like. Aqueous mixtures of said lower monohydric alcohols are particularly preferred.

The extracts resulting from the above-described step 2 can be concentrated to dryness under mild temperature conditions and the crude active ingredient recovered therefrom as a residue. Alternatively, the active ingredient can be precipitated from solution by the addition of a suitable precipitating agent, e.g., acetone, and recovered by filtration. In the preferred method, however, the extract of step 2 is deionized prior to concentration as to remove ionic contaminants which would otherwise remain with the active ingredient upon removal of the polar solvent.

Deionization is performed by passing the polar extract of step 2, preferably after said extract has been substantially reduced in volume by evaporating therefrom a portion of the polar solvent, through a strongly acid cation-exchange resin capable of splitting salts by adsorbing all cations from solution, while releasing hydrogen ions to maintain the ionic balance, and through a strongly basic anion-exchange resin capable of adsorbing all anions and replacing them by hydroxyl ions.

The sequence of the deionization steps is not important and equally satisfactory results are obtained whether the cations are removed before the anions or vice-versa. In practice, it is preferred to use specially prepared mixtures of ion-exchange resins which are capable of removing both anions and cations.

The active ingredient can be recovered from the polar eluate in a number of manners. Preferably, the polar eluate is reduced in volume to a more concentrated form by any suitable evaporation technique, under mild temperature conditions, after which the concentrate is finally dried by lyophilization. Alternatively, the active material can be recovered from the polar eluate by adding to said polar eluate a suitable agent, e.g., acetone, that will effect precipitation of the active material, which can then be removed by filtration and dried.

It has also been found that the active material can be further purified by extracting same with a boiling monohydric alcohol, such as isopropanol or higher alcohols, and recovering the insoluble product thereof, which represents the active component of the invention, by filtration.

In order to illustrate the invention more particularly, the following specific example is given:

Fresh fern (*Polypodium polypodioides* (L.) Watt variety) was air-dried at 120° F. and then ground in a Tornado mill to a coarse powder.

The ground fern was extracted continuously in a Soxhlet glass extracter with an azeotropically-boiling mixture of benzene: ethyl alcohol (about 2:1). The extracted fern was then washed with cold methanol and air-dried.

The delipified fern was then extracted with 3000 ml. of 50% aqueous methanol for a period of 10 minutes under reflux conditions. The extraction step was repeated and the aqueous methanol extracts were cooled and clarified by filtration.

The aqueous methanol extract was concentrated to about 1/10 of its original volume and passed at a flow rate of 60 ml. per minute through an ion exchanger containing a volume of 1700 ml. of a mixed resin available from the Rohm and Haas Co. (Philadelphia, Pa.) under the trademark Amberlite MB–1. Said resin is a specially prepared mixture consisting of a sulfonated polystyrene, a strongly acid cation-exchange resin, and a quaternary ammonium polystyrene, a strongly basic anion-exchange resin. The eluate was concentrated and dried by lyophilization.

The lyophilized product was extracted with boiling isopropanol (100 ml. per gram of product) and the insoluble product was recovered by filtration on a steam-heated Buchner funnel. The extraction step was repeated and the final product was air-dried. The overall yield was calculated to be about 2.2 percent, based on the weight of air-dried fern employed.

The novel products of the invention are tan-brown amorphous solids, soluble in water and in aqueous solutions of lower alcohols, and generally insoluble in nonpolar solvents. On hydrolysis, the products yield glucose, galactose, arabinose and trace amounts of other unidentified monosaccharides. Results of microanalytical and chemical analyses of the products obtained from various ferns are set forth in Table 1 which follows. Phenol assays were done by the Folin-Ciocalteu method, hexose assays by the anthrone test, and pentose assays by the orcinol test.

posed of one or more therapeutically active components admixed with inactive components which are not removed by the extraction process. The amount of inactive components, as determined by the therapeutic effectiveness of the composition at a given dosage, seems to vary according to the particular variety of fern from which the product is extracted.

As indicated hereinbefore, the novel compositions of the present invention have been found useful to prevent or treat gastrointestinal ulcerations in warm-blooded animals and hence useful in the prevention and control of peptic ulcers and other gastrointestinal disorders.

The following tests were carried out to determine the efficacy of the therapeutic compositions of the invention in preventing experimentally-induced gastric ulcers in rats.

Adult male albino rats were prepared according to the procedure of Shay et al. described in Gastroenterology, 5, 43 (1945). The test animals were fasted for 48 hours prior to ligation of the pylorus of the stomach. The test materials were given intraperitoneally as solutions in distilled water in divided doses: one half thirty minutes before the ligation was performed and the other half after ligation. After the abdominal wound was sutured, the animals were placed in separate cages to recover from the anesthetic. Eighteen hours later, mortality was noted and the animals were sacrificed. The entire stomachs were removed, dissected, and the glandular and non-glandular portions thereof were then carefully examined for the presence of ulcers as observed under low-power binocular microscopes.

Table II which follows hereinafter sets forth the test results in terms of therapeutic efficacy and of ability to prevent mortality in the test animals. The effective dose ($ED_{50}$), expressed in milligrams of test compound per kilogram of animal body weight, was estimated from the test results and signifies the dose of test material capable of protecting 50% of the test animals from ulcer formation.

TABLE II

| Material Source | Concentration used (mg. of material/ml. of distilled water) | Total Dose (mg./kg.) | Protection from Ulcer Formation (number of rats protected/number or rats used) | Mortality (number of rats dead/number of rats used) | $ED_{50}$ (mg./kg.) |
|---|---|---|---|---|---|
| Control | | | 0/12 | 5/8 | |
| Polypodium polypodioides (L.) Watt var. | 2.0 | 133.3 | 5/6 | 0/6 | 47 |
|  | 1.0 | 66.7 | 5/6 | 0/6 | |
|  | 0.5 | 33.3 | 1/6 | 1/6 | |
| Polypodium vulgare (L.) var. serratum. | 2.0 | 133.3 | 6/6 | 0/6 | 52 |
|  | 1.0 | 66.7 | 10/12 | 1/12 | |
|  | 0.5 | 33.3 | 0/6 | 0/6 | |
| Nephrolepis exaltata bostoniensis. | 1.0 | 66.7 | 6/6 | 0/6 | 39 |
|  | 0.5 | 33.3 | 2/6 | 1/6 | |

TABLE 1

| Fern | Elemental Analysis, percent | | | Chemical Analysis, percent | | |
|---|---|---|---|---|---|---|
| | C | H | N | Phenol | Hexose | Pentose |
| Polypodium polypodioides (L.) Watt var. | 49.77 / 50.03 | 5.69 / 5.83 | 2.95 / 2.89 | 19.8 | 27.3 | 5.52 |
| Polypodium vulgare (L.) var. serratum. | 49.14 / 40.09 | 5.96 / 6.06 | 3.58 / 3.70 | 22.2 | 24.6 | 16.5 |
| Nephrolepis exaltata bostoniensis. | 45.39 / 45.17 | 5.85 / 5.61 | 4.46 / 4.32 | 13.1 | 26.8 | 6.35 |

In the drawings:

FIG. 3 is the infra-red spectrum of product obtained from Nephrolepis exaltata bostoniensis.

Figure 1:
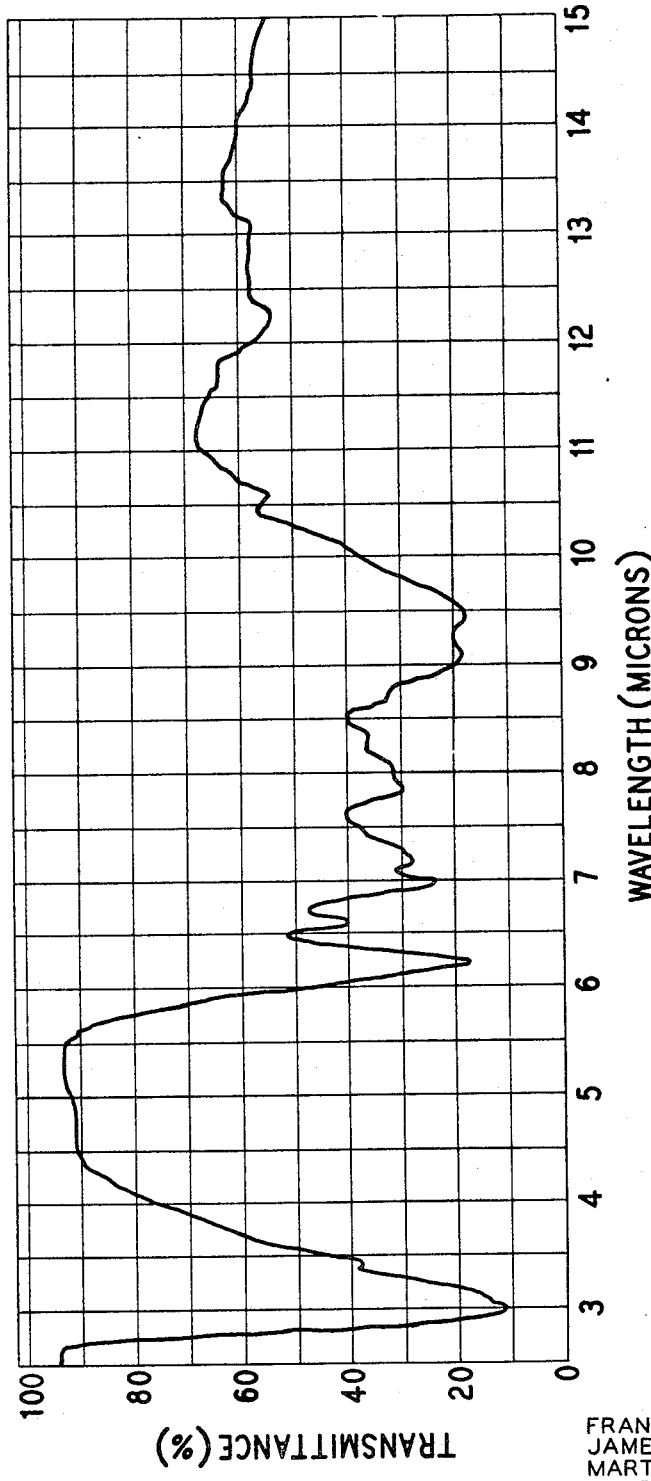
FIG. 1 is the infra-red spectrum of product obtained from Polypodium polypodioides (L.) Watt var.
Figure 2:
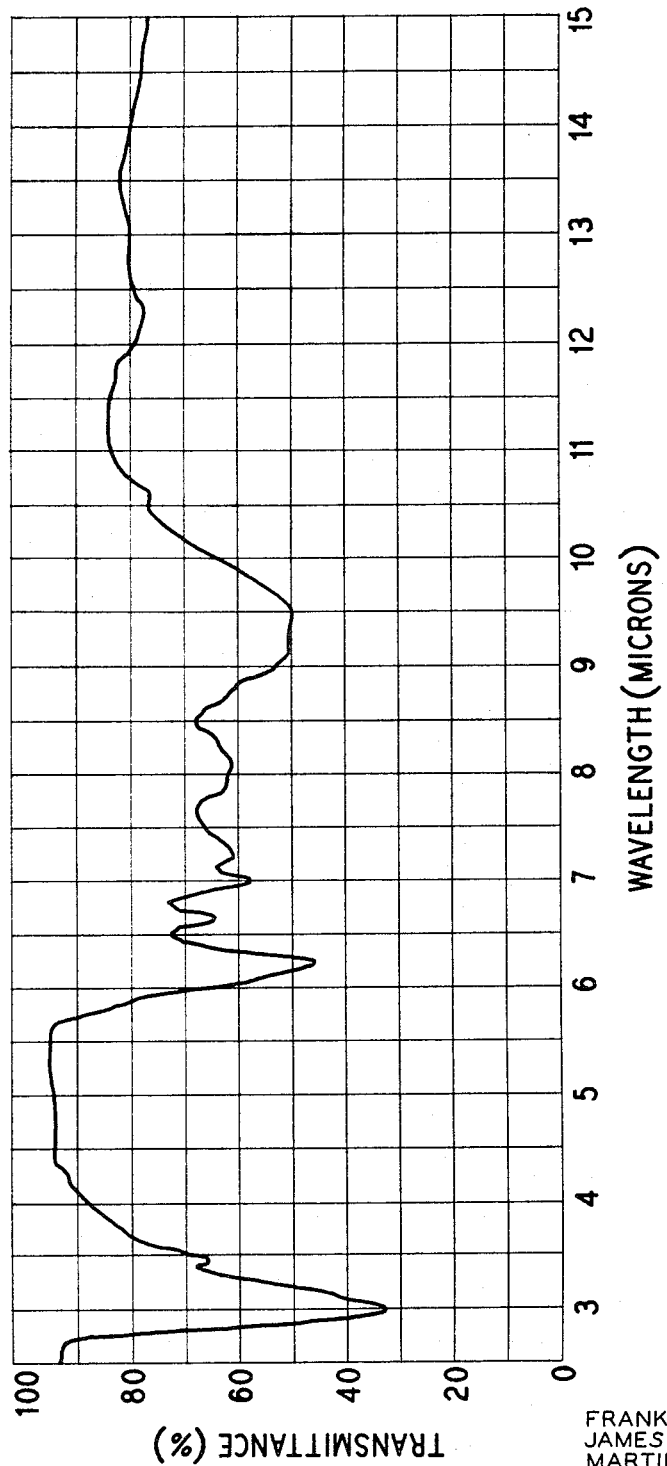
FIG. 2 is the infra-red spectrum of product obtained from Polypodium vulgare (L.) var. serratum.

It is to be noted from the drawing that the products of the invention exhibit bands of maximum absorption at wave lengths of 3.0, 6.2, 6.6, 7.0, 7.2, 7.9 and 9.5 microns.

From the elemental and chemical analyses and from the infra-red spectra, it is apparent that the products are not single chemical entities but rather comprise more than one compound. It is theorized that the products are com- Oral and intraperitoneal toxicity of one of the novel compositions of the present invention was also determined. Material obtained from Polypodium polypodioides (L.) Watt var. was administered to male rats suspended in water and the lethal dosage ($LD_{50}$), expressed in milligrams of material per kilogram of animal body weight, was calculated from the test results. Said dosage represents the amount causing death to 50% of the test animals. The results are as follows:

| Method of Administration | $LD_{50}$ (mg./kg.) |
|---|---|
| Oral | >2100 |
| Intraperitoneal | 190±26.7 |

As evidenced from the data set forth herein above, the compositions of the present invention are non-toxic in amounts at which significant therapeutic effectiveness is evidenced.

The invention in its broader aspects is not limited to the specific steps, methods and compositions described, but departures may be made therefrom within the scope of the accompanying claims without departing from the principles of the invention and without sacrificing its chief advantages.

What we claim is:

1. A method of obtaining therapeutic compositions useful for the prevention and treatment of gastrointestinal ulcerations in warm-blooded animals, said method comprising the steps of:
   (a) treating ferns selected from the group consisting of ferns of the Polypodiaceae family and ferns of the Davalliaceae family with a delipification solvent to extract therefrom lipid plant materials, leaving a residue containing water-soluble components;
   (b) treating said residue with a polar solvent medium to obtain an extract containing the therapeutically-active component; and
   (c) recovering from said extract the therapeutically-active component in a concentrated form.

2. The method of claim 1 wherein the delipification solvent contains major amounts of a compound selected from the group consisting of saturated aliphatic hydrocarbons, aromatic hydrocarbons, chlorinated hydrocarbons and ethers.

3. The method of claim 1 wherein the polar solvent medium is selected from the group consisting of water, lower monohydric alcohols, and mixtures thereof.

4. The method of claim 1 wherein the polar extract is subjected to a deionization treatment prior to recovering the therapeutically-active component therefrom.

5. The method of claim 4 wherein the deionization treatment comprises contacting the polar extract with a strongly-acid ion exchange resin and a strongly-basic ion exchange resin.

6. A method of obtaining therapeutic compositions useful for the prevention and treatment of gastrointestinal ulcerations in warm-blooded animals, said method comprising the steps of:
   (a) treating ferns selected from the group consisting of ferns of the Polypodiaceae family and ferns of the Davalliaceae family with a delipification solvent to extract therefrom lipid plant materials, leaving a residue containing water-soluble components;
   (b) treating said residue with a polar solvent medium to obtain an extract containing the therapeutically-active component;
   (c) contacting said extract with a strongly-acid ion exchange resin and a strongly basic ion exchange resin; and
   (d) subjecting said extract to evaporation conditions to obtain a powder concentrate containing the therapeutically-active component.

7. The method of claim 6 wherein the powder concentrate is further purified by contacting same with a boiling monohydric alcohol medium as to remove impurities soluble in said medium and recovering the insoluble portion therefrom.

8. The method of claim 7 wherein the alcohol is isopropanol.

9. A concentrated component extracted from ferns selected from the group consisting of ferns of the Polypodiaceae family and ferns of the Davalliaceae family and useful in the prevention and treatment of gastrointestinal ulcerations in warm-blooded animals, said component being characterized by the following properties:
   (a) it is a tan-brown amorphous powder;
   (b) its infra-red spectrum exhibits bands of maximum adsorption at 3.0, 6.2, 6.6, 7.0, 7.2, 7.9 and 9.5 microns;
   (c) it is soluble in water and in aqueous mixtures of lower aliphatic alcohols and it is generally insoluble in non-polar solvents;
   (d) it contains from about 45 to about 50 percent carbon, from about 5.6 to about 6.0 hydrogen and from about 2.9 to about 4.5 nitrogen;
   (e) it has a phenol content in the range of from about 15 to about 20 percent; a hexose content in the range of from about 24 to about 28 percent; and a pentose content of from about 5 to about 17 percent; and
   (f) on hydrolysis, yields glucose, galactose and arabinose, said component being obtained by the steps of:
      (a) treating ferns selected from the group consisting of ferns of the Polypodiaceae family and ferns of the Davalliaceae family with a delipification solvent to extract therefrom lipid plant materials, leaving a residue containing water-soluble components;
      (b) treating said residue with a polar solvent medium to obtain an extract containing the therapeutically-active component; and
      (c) recovering from said extract the therapeutically-active component in a concentrated form.

10. A method of preventing and treating gastrointestinal ulcerations in a warm-blooded animal which comprises administering internally to said animal a therapeutically effective amount of the concentrated component of claim 9.

References Cited

"American Druggists," XXX:3 (1897) p. 73.

Youngken, H. W., "Textbook of Pharmacognosy," Blakiston, (1943) p. 88.

ALBERT T. MEYERS, *Primary Examiner.*

S. ROSEN, *Assistant Examiner.*

UNITED STATES PATENT OFFICE
CERTIFICATE OF CORRECTION

Patent No. 3,395,223                                      July 30, 1968

Frank Milan Berger et al.

It is certified that error appears in the above identified patent and that said Letters Patent are hereby corrected as shown below:

In the heading to the drawings, Sheets 1, 2 and 3, line 1, "McCAN", each occurrence, should read -- MILAN --. In the heading to the printed specification, line 4, "McCan" should read -- Milan --.

Signed and sealed this 13th day of January 1970.

(SEAL)
Attest:

Edward M. Fletcher, Jr.                        WILLIAM E. SCHUYLER, JR.
Attesting Officer                                     Commissioner of Patents